United States Patent
Palumbo et al.

(10) Patent No.: US 9,004,240 B2
(45) Date of Patent: Apr. 14, 2015

(54) FRICTION LINER

(71) Applicant: Integran Technologies Inc., Mississauga (CA)

(72) Inventors: Gino Palumbo, Toronto (CA); Klaus Tomantschger, Mississauga (CA)

(73) Assignee: Integran Technologies Inc., Ontario (CA)

( * ) Notice: Subject to any disclaimer, the term of this patent is extended or adjusted under 35 U.S.C. 154(b) by 150 days.

(21) Appl. No.: 13/778,166

(22) Filed: Feb. 27, 2013

(65) Prior Publication Data

US 2014/0242405 A1 Aug. 28, 2014

(51) Int. Cl.
*F16D 69/02* (2006.01)

(52) U.S. Cl.
CPC ......... *F16D 69/027* (2013.01); *Y10T 428/1291* (2015.01); *Y10T 428/24355* (2015.01); *Y10T 428/12014* (2015.01); *Y10T 428/12986* (2015.01); *Y10T 428/12993* (2015.01); *Y10T 428/12778* (2015.01)

(58) Field of Classification Search
CPC .................................................. F16D 69/027
USPC .... 188/218 R, 218 XL, 250 R, 251 R, 251 A, 188/251 M, 255
See application file for complete search history.

(56) References Cited

U.S. PATENT DOCUMENTS

| | | |
|---|---|---|
| 3,625,758 A | 12/1971 | Stahl |
| 3,652,351 A | 3/1972 | Guisti |
| 3,671,411 A | 6/1972 | Ray |
| 4,054,693 A | 10/1977 | Leech |
| 4,234,398 A | 11/1980 | Yamamoto |
| 4,425,380 A | 1/1984 | Nuzzi |
| 4,552,626 A | 11/1985 | Stevenson |
| 4,592,852 A | 6/1986 | Courduvelis |
| 4,601,784 A | 7/1986 | Krulik |
| 4,704,196 A | 11/1987 | Saito |
| 4,808,275 A | 2/1989 | Ohzora |
| 4,839,006 A | 6/1989 | Nakao |
| 4,859,300 A | 8/1989 | Sullivan |
| 5,062,930 A | 11/1991 | Dillon |
| 5,185,185 A | 2/1993 | Nishizawa |
| 5,203,973 A | 4/1993 | Reith |
| 5,224,572 A | 7/1993 | Smolen |
| 5,229,169 A | 7/1993 | Chao |
| 5,352,266 A | 10/1994 | Erb |
| 5,382,505 A | 1/1995 | Schmidt |
| 5,433,797 A | 7/1995 | Erb |
| 6,080,493 A | 6/2000 | Kent |
| 6,547,944 B2 | 4/2003 | Schreiber |
| 7,168,534 B2 | 1/2007 | Loszewski |
| 7,320,832 B2 | 1/2008 | Palumbo |
| 7,354,354 B2 | 4/2008 | Palumbo |
| 7,771,289 B2 * | 8/2010 | Palumbo et al. ............... 473/324 |
| 7,921,972 B2 * | 4/2011 | D'Almeida et al. .... 188/218 XL |
| 8,113,530 B2 | 2/2012 | Pierick |
| 8,247,050 B2 | 8/2012 | McCrea |
| 8,309,233 B2 | 11/2012 | Facchini |
| 2005/0205425 A1 | 9/2005 | Palumbo |
| 2006/0135281 A1 | 6/2006 | Palumbo |
| 2006/0135282 A1 | 6/2006 | Palumbo |
| 2006/0153728 A1 | 7/2006 | Schoenung |
| 2007/0062768 A1 | 3/2007 | Hanna |
| 2007/0068750 A1 | 3/2007 | Hara |
| 2007/0234929 A1 * | 10/2007 | Reinsch et al. ......... 188/218 XL |
| 2007/0281176 A1 | 12/2007 | Palumbo |
| 2009/0026025 A1 | 1/2009 | Hampton |
| 2009/0159451 A1 | 6/2009 | Tomantschger |
| 2010/0282613 A1 | 11/2010 | Schuh |
| 2010/0304063 A1 * | 12/2010 | McCrea et al. .............. 428/35.8 |
| 2010/0304065 A1 | 12/2010 | Tomantschger |
| 2010/0304179 A1 * | 12/2010 | Facchini et al. ............... 428/615 |
| 2011/0287203 A1 | 11/2011 | Victor |
| 2011/0287223 A1 | 11/2011 | Victor |
| 2012/0118686 A1 | 5/2012 | Meckel |
| 2012/0237789 A1 | 9/2012 | Wang |

FOREIGN PATENT DOCUMENTS

| | | |
|---|---|---|
| DE | 19721473 A1 * | 12/1998 |
| DE | 102 28 323 | 1/2004 |
| JP | 01153826 A2 | 6/1989 |
| WO | 2005064190 | 7/2005 |

OTHER PUBLICATIONS

EPO translation, DE 197 21 473 Al, Henke et al., Dec. 1998.*
Facchini et al.; "Nanostructured Metals and Alloys—Use of Nanostructured Cobalt Phosphorus as a Hard Chrome-Alternative for Functional Applications", Jahrbuch Oberflächentechnik 2008, Band 64, Eugen G. Leuze Verlag, Bad Saulgau, p. 34-45.

(Continued)

*Primary Examiner* — Thomas J Williams

(74) *Attorney, Agent, or Firm* — Rankin, Hill & Clark LLP

(57) ABSTRACT

Grain-refined and amorphous metallic material based friction liners for braking devices as used, e.g., in motor vehicles such as cars, trucks, motorcycles, as well as bicycles and other applications requiring, at least at times, decelerating rotating parts are disclosed. Friction liners can have isotropic or anisotropic properties and the friction surfaces can optionally be rendered hydrophobic.

21 Claims, No Drawings

(56) References Cited

OTHER PUBLICATIONS

Wang et. al.; "Effect of Surface Nanocrystallization on Friction and Wear Properties in Low Carbon Steel"; Materials Science and Engineering, vol. 352, Issues 1-2, , pp. 144-149 (2003).

Bhattacharya et al.; "Grain Structure Effects on the Lattice Thermal Conductivity of Ti-based half-Heusler Alloys"; Applied Physics Letters, vol. 81, Issue 1, pp. 43-45 (2002).

Rowe et al.; "The Effect of Phonon-grain Boundary Scattering on the Lattice Thermal Conductivity and Thermoelectric Conversion Efficiency of Heavily Doped Fine-grained, Hot-pressed Silicon Germanium Alloy," Journal of Applied Physics, vol. 52, Issue 12, pp. 7421-7426 (1981).

Soyez et. al.; "Grain-size-dependent Thermal Conductivity of Nanocrystalline Yttria Stabilized Zirconia Films Grown by Metal-organic Chemical Vapor Deposition"; Applied Physics Letters, vol. 77, Issue 8, pp. 1155-1157 (2000).

Yin et. al.; "Creep Behavior of Nanocrystalline Nickel at 290 and 273K"; Materials Science and Engineering A301, pp. 18-22 (2001).

* cited by examiner

FRICTION LINER

FIELD OF THE INVENTION

The present invention generally relates to friction liners for braking devices as used, e.g., in motor vehicles such as cars, trucks, motorcycles, as well as bicycles and other applications requiring, at least at times, means for decelerating rotating parts and more particularly to an improvement in the friction surface of mating brake parts of braking systems such as brake rotors/brake disks of the disk brakes with brake pads, and brake drums with brake pads.

BACKGROUND OF THE INVENTION

The present invention generally relates to friction liners for use in a braking system as, e.g., employed in vehicles, including, but not limited to, cars, trucks, motorcycles, bicycles, snowmobile and the likes.

The prior art describes various approaches relevant to brake systems:

Meckel et. al. in US 2012/0118686 disclose a brake disk made of various steels or a ceramic composite material coated with a material which provides for the coated surface to have a variety of "textured" appearances. The coating provides wear and corrosion resistance and includes a first layer of a metal, such as a pure titanium metal, and a second layer that can include a Nitride, Boride, Carbide or Oxide of the metal used in the first layer. The coating can be applied using a physical vapor deposition source such as a cathodic arc source with a controlled gas atmosphere.

Meckel et. al. in US US2011/0048871 disclose a vehicle braking system which includes a rotating braking element containing a bulk structural material and a friction surface. The friction surface can include an outer coating that includes a corrosion and wear-resistant material. The outer coating can include a decorative color whose color and original appearance are substantially retained after repeated uses in stopping or slowing the vehicle.

Kimihiko et. al. in JP01-153826A2 (1987) disclose light weight and high strength disk brake rotors by joining a rotor body made of an aluminum alloy and a rotor sliding member made of stainless steel together via an intermediate layer made of a nickel-aluminum intermetallic compound to reduce the generation of thermal fatigue on the joined portion due to repeated braking action caused by the different thermal expansion coefficients.

Hampton et. al. in US 2009/0026025 disclose a brake rotor for a vehicle which contains a first coating of a ceramic anti-wear material on a cast iron disk to provide an annular friction surface for braking engagement with a brake pad. The disk has a second coating different from the first coating adhering to the disk to provide an annular non-braking surface spaced from the friction surface. The non-braking surface provided by the second coating is resistant to corrosion.

Hanna et. al. in US 2007/0062768 disclose a friction damped disk brake rotor including a ceramic coating on an insert, wherein the insert has a body with tabs extending therefrom to hold the insert in a desired position within a mold.

Smolen et. al. in U.S. Pat. No. 5,224,572 (1993) disclose a light weight brake rotor including an aluminum rotor having an inner section integrally formed with an outer section and a braking surface containing a ceramic coating comprised of at least one of aluminum oxide, aluminum, titanium and magnesium zirconate. A plurality of circumferentially and radially spaced cooling apertures is provided between the sections to vent heat away from the disk and keeps the temperature of the aluminum rotor below 127° C.

Ohzora et. al. in U.S. Pat. No. 4,808,275 (1989) disclose a rotor for a disk brake coated with nickel containing ceramic particles having a thickness of at least 2 μm, thereby improving corrosion resistance while minimizing torque fluctuation of the rotor during braking. The nickel coating is formed on the surface of the rotor by composite plating in which nickel and the ceramic particles are simultaneously electrodeposited on the surface of the rotor. An annular jig surrounding the outer periphery of the rotor is used to insure a uniform coating thickness.

Hara et. al. in US 2007/0068750 disclose bicycle disk brake pads used in a disk brake device for a bicycle in which a friction member is bonded to a backplate by a diffusion bonding method. The bicycle disk brake pad has a backplate, a spray coating layer and a friction member. The surface of the backplate is covered with a layer of copper or a copper alloy applied by spray coating. The friction member formed by calcination of powders is bonded to the spray coating layer by a diffusion bonding method. Preferably, the spray coating surface is rough.

Kent et. al in U.S. Pat. No. 6,080,493 (2000) describe tank treads, brake linings, rifles stocks, and other devices requiring the bonding of metal to rubber, epoxy, or plastic, with a layer of metal foam interposed between the metal and the rubber or plastic.

Loszewski et, al. in U.S. Pat. No. 7,168,534 (2007) describe an improved clutch or brake device in which at least two members are mounted for relative rotation and engagement. The friction material has a solid density of greater than 30% and includes an open lattice of carbon ligaments forming a network of three dimensionally interconnected cells; and a pyrolytic carbon coating on the open lattice of carbon ligaments.

The prior art describes various coarse-gained, grain-refined and amorphous metallic materials which can be monolithic or layered:

Erb et. al. in U.S. Pat. No. 5,352,266 (1994) and U.S. Pat. No. 5,433,797 (1995), which are assigned to the same assignee as the present application, describe a process for producing nanocrystalline materials, particularly nanocrystalline nickel. The nanocrystalline material is electrodeposited onto the cathode in an aqueous acidic electrolytic cell by application of a pulsed current.

Palumbo et. al. in U.S 2005/0205425 and DE 10228323, both being assigned to the same assignee as the present application, disclose a process for forming coatings, layers or freestanding deposits of nanocrystalline metals, metal alloys or metal matrix composites. The process employs tank plating, drum plating or selective plating processes using aqueous electrolytes and optionally a non-stationary anode or cathode. Nanocrystalline metal matrix composites are disclosed as well.

Tomantschger et. al. in U.S. 2009/0159451, assigned to the same assignee as the present application, disclose graded and/or layered, variable property electrodeposits of fine-grained and amorphous metallic materials, optionally containing solid particulates.

Facchini et. al. in U.S. Pat. No. 8,309,233 (2012), assigned to the same assignee as the present application, disclose fine-gained and amorphous metallic materials comprising cobalt of high strength, ductility and fatigue resistance.

Tomantschger et. al. in U.S. 2010/0304065, assigned to the same assignee as the present application, disclose metal-clad polymer articles comprising polymeric materials having fine-grained (average grain-size of 2 nm to 5,000 nm) or amorphous metallic materials of enhanced pull-off strength between the metallic material and the polymer which are optionally wetproofed.

McCrea et. al. in U.S. Pat. No. 8,247,050 (2012), assigned to the same assignee as the present application, disclose metal-coated polymer articles containing structural substantially porosity-free, fine-grained and/or amorphous metallic coatings/layers optionally containing solid particulates dispersed therein deposited on polymer substrates. The fine-grained and/or amorphous metallic coatings are particularly suited for strong and lightweight articles, precision molds, sporting goods, aerospace and automotive parts and other components exposed to thermal cycling and stress created by erosion and impact damage.

Wang et. al. in U.S. 20120237789, assigned to the same assignee as the present application, disclose a metal-clad polymer article. The metallic material has a microstructure which is at least one of fine-grained with an average grain size between 2 and 5,000 nm and amorphous. The metallic material has an elastic limit between 0.2% and 15%. The stress on the polymeric material, at a selected operating temperature, reaches at least 60% of its ultimate tensile strength at a strain equivalent to the elastic limit of said metallic material.

Schreiber et. al. in U.S. Pat. No. 6,547,944 (2003) disclose an electroplating method for forming a nanolaminate structure with layers of substantially a first metal and substantially a second metal including Cu and Ni, which each layer being less than 1 μm in thickness.

Schuh in et. al. in US 2010/0282613 disclose means to tailor the topography of a nanocrystalline or amorphous metal or alloy, which may be produced by any method including electrodeposition. Metals and alloys with a nanocrystalline or an amorphous structure are reported to exhibit superior physical and/or functional properties, such as high strength, high corrosion-resistance and a low coefficient of friction making them particularly suitable for use as surfaces in tribological coatings requiring a low coefficient of friction replacing traditionally used chromium coatings.

Victor et. al. in US 2011/0287223, assigned to the same assignee as the present application, describe articles having exposed metallic surfaces comprising durable, fine-grained and/or amorphous microstructures which, at least in part, are rendered water repellant by suitably texturing and/or roughening the surface to increase the contact angle for fluids including water, thus reducing the wetting behavior of the surface, reducing corrosion and enabling efficient cleaning and drying.

Pierick et. al. in U.S. Pat. No. 8,113,530 (2012), assigned to the same assignee as the present application, describe the use of nanostructured materials in sports equipment specifically of human propelled vehicles such as bicycles, specifically the design, manufacture, and construction of bicycle frames and other bicycle components with nanostructured materials deposited onto polymeric or metallic substrates to improve impact strength and wear performance.

Cesarini et. al. in WO 2005/064190 disclose a mechanical device such as disk brake calipers for transmitting the drive force and/or braking force in vehicles made of a nanocrystalline metal alloy, e.g., Al and Mg based alloys, comprising at least 10% per weight of a material having a grain size less than 100 nm.

Schoenung et. al. in US 2006/0153728 disclose bulk nanostructured alloys, such as aluminum 5083 alloys reinforced with 10 wt. % particulate $B_4C$, synthesized by cryomilling and spark plasma sintering. The nanostructured alloys are degassed and consolidated into dense bulk materials using spark plasma sintering. The nanostructured materials are suitable for use in numerous applications including aerospace components and automotive parts Thus, the prior art does not specifically teach the use of grain-refined or amorphous metals as friction liners in braking applications.

SUMMARY OF THE INVENTION

The Applicants have surprisingly discovered that brake liner friction surfaces requiring a high coefficient of friction for use in brake systems, including but not limited to, brake rotors, brake drums and brake pads, can be made of grain-refined and/or amorphous metallic materials although the coefficient of friction of grain-refined and amorphous metallic materials is much lower than the coefficient of friction of their coarse-grained counterparts of the same or similar chemical composition.

It is an objective of the present invention to provide durable, scratch and abrasion resistant, strong, lightweight friction liners for brake parts for use in various applications requiring the control and/or the reduction of the speed of rotating parts, e.g., rotating parts used in transportation applications including automotive, cars, trucks, motorcycles, aircrafts, bicycles and snowmobiles where friction brake systems are used to, on demand, reduce the rotation speed of wheels, running tracks and the like.

It is an objective of the present invention to provide friction liners for any application in which at least two members at least periodically engage with each other and at least one of the members is a rotating part including such as used, among other, in brakes and transmissions.

It is an objective of the present invention to provide stationary or rotating friction liners for brake parts and brake systems comprising metallic materials. The friction liners can be provided on metallic, polymeric or carbon-based substrates; they can also be provided without substrate, i.e., in freestanding form. The friction liners can also extend beyond the friction surface to form, e.g., the entire rotor, i.e., the liner forms the rotor and no substrate material is being employed and the friction surface is defined by the area(s) where the brake pads and brake rotor mate at any time when the brakes are applied.

It is an objective of the present invention to provide friction liners for brake parts made of metallic materials capable of achieving a deceleration rate from maximum speeds between 25 km/h and 100 km/h of at least 0.5 m/sec$^2$, preferably at least 1 m/sec$^2$, more preferably at least 2.5 m/sec$^2$ and most preferably at least 5 m/sec$^2$.

It is an objective of the present invention to provide lightweight articles comprising, at least in part, liquid repellent and/or self-cleaning outer surfaces with increased wear, erosion and abrasion resistance, durability, strength, stiffness, thermal conductivity and thermal cycling capability.

It is an objective of the invention to provide friction liners with a high thermal conductivity to enable to readily dissipate the heat generated.

It is an objective of the present invention to provide friction liners for brake parts which have superior heat conduction properties of at least 75 W/mK, preferably at least 80 W/mK, more preferably at least 90 W/mK and most preferably at least 150 W/mK and optionally include means for cooling the part during use/rotation.

It is an objective of the present invention to provide friction liners for brake parts which have a specific heat capacity of at least 1.75 J/(ml·K), preferably at least 2.0 J/(ml·K).

It is an objective of the present invention to provide friction liners for brake parts which have a linear coefficient of thermal expansion in at least one direction in the range of 0 to $50 \times 10^{-6} \, K^{-1}$.

It is an objective of the invention to provide friction liners where the linear coefficient of thermal expansion is matched between the various friction liner layers, if any, and between the friction liners and substrates, if any.

It is an objective of the present invention to provide friction liners containing or attached to open cell foams, including, but not limited to Al, Cu, Ni and graphite foams, of high thermal conductivity to efficiently remove the heat from the friction surface.

It is an objective of the present invention to provide friction liners for brake parts which prevent the formation of undesirable oxide films or reduce oxide films when in contact with the mated part, as oxide films lower the thermal conductivity and lower the coefficient of friction by over 30 to 50% compared to their metallic counterparts.

It is an objective of the present invention to provide light weight, corrosion resistant friction liners comprising one or more layers of grain-refined or amorphous metallic materials for a number of applications, e.g, as required in braking systems.

It is an objective of the present invention to provide friction liners made of grain-refined and/or amorphous metallic materials with superior friction surfaces converting the vehicles kinetic energy into heat, which can sustain high operating temperatures without excessive wear requiring frequent replacement.

It is an objective of the present invention to utilize durable metallic materials comprising an amorphous and/or fine-grained microstructure as the friction surface which have a coefficient of friction which, when tested on dry and/or wet surfaces, is lower than their coarse grained counterparts of equivalent chemical composition.

It is an objective of the present invention to use at least one part defining the friction surface made of metallic materials which have an amorphous and/or a fine-grained microstructure.

It is an objective of the present invention to utilize metallic materials having an amorphous and/or fine-grained microstructure for both parts defining the friction surface. The part designed for increased wear and replacement can be of the same or different chemical composition than their counterpart defining the mating surface. In the case the parts have the same chemical composition, e.g., the brake pad and brake rotor forming the friction surface have the same or a similar composition, the surface designed to wear, i. e., the brake pad, can have a larger average grain size than the rotor defining the friction surface when mating with the brake pad to provide the lower hardness required to preferentially wear off. For instance the durable part can have a microstructure which is amorphous or crystalline with an average grain size in the range of 2 to 100 nm, whereas the mating surface of the "wear part" can have a microstructure with an average grain size in the range of 200 nm to 10,000 nm, or it can be coarse grained with an average grain size exceeding 10 μm.

It is an objective of the invention to provide friction surfaces comprising metallic layers selected from the group of amorphous and/or fine-grained metals, metal alloys or metal matrix composites. The exposed metallic layer forming at least part of the friction surface comprises at least some fine-grained and/or amorphous metallic materials which can be produced in freestanding form and appropriately shaped or shaped after forming by any suitable process including cutting or grinding or which can be applied to suitable temporary or permanent substrates by a large variety of metal forming or deposition processes. Preferred metal deposition processes which can be used to produce a microstructure which is fine-grained and/or amorphous are selected from the group consisting of electroless deposition, electro deposition, physical vapor deposition (PVD), chemical vapor deposition (CVD), cold spraying and gas condensation. Any other suitable metal processing technique for rendering the microstructure of metallic material fine grained including, e.g., severe plastic deformation, or for rendering the microstructure amorphous, e.g., rapid solidification, are contemplated as well.

It is an objective of the present invention to provide friction liners comprising a single or multiple structural metallic layers which have a total thickness in the range of between 1 μm and 2.5 cm, preferably between 50 μm and 2.5 mm and more preferably between 100 μm and 500 μm.

It is an objective of the invention to provide friction liners made of fine-grained and/or amorphous metallic materials with a high yield strength (25 MPa to 2,750 MPa) and ductility (0.1% to 45%).

It is an objective of the present invention to utilize the enhanced mechanical strength and wear properties of fine-grained metallic coatings/layers with an average grain size between 1 nm and 5,000 nm, and/or amorphous coatings/layers and/or metal matrix composite coatings/layers. Metal matrix composites (MMCs) in this context are defined as particulate matter embedded in a fine-grained and/or amorphous metal matrix. MMCs can be produced, e.g., in the case of using an electroless plating or electroplating process, by suspending particles in a suitable plating bath and incorporating particulate matter into the deposit by inclusion or, e.g., in the case of cold spraying, by adding non-deformable particulates to the powder feed.

It is an objective of the present invention to provide friction liners which are isotropic.

It is an objective of the present invention to provide friction liners which are anisotropic, e.g., the grain size or fillers employed in the friction liner are fibrous and have a large aspect ratio between their length and diameter, and the fibers are aligned in parallel to the friction surface; they can also be aligned not in parallel to the friction surface such as with their length perpendicular to the friction surface. Friction liners can also be graded or layered to achieve the desired properties and the grade or sublayers can be aligned in parallel, not in parallel and perpendicular to the friction surface. Other anisotropic shapes such as flakes and platelets are contemplated as well.

It is an objective of the present invention to employ grain-refined and amorphous metallic materials having structured outer surfaces as friction liners that are non-wetting, i.e., hydrophobic, to improve the braking behavior in wet operating conditions.

It is an objective of the present invention to provide friction liner with structured friction liner surfaces to render such processed friction surfaces super-hydrophobic and self-cleaning.

It is an objective of the present invention to suitably texture at least portions of one or both friction surfaces to form a large number of micron-sized features including at least one of recesses, protrusions and elevations termed "micron-sized surface structures" or "micron-sized surface sites".

It is an objective of the present invention to suitably create numerous pits and crevices or protrusions in at least portions of the outer friction surface that are randomly and/or evenly distributed. The shape, size and population of sites such as recesses, pits, crevices, depressions and the like is believed to enable the entrapment of air thus providing for the "lotus" or "petal" effect observed in nature. It is an objective to create micro-sized surface structures exceeding a density of between 25 and 10,000 sites per $mm^2$ area, preferably between 100 and 5,000 sites per $mm^2$ area or a range of between 5 and 100 sites per mm. Surface sites range from 5-100 μm in depth, preferably 10-50 μm in depth; from 5-100 μm in diameter, preferably from 10-50 μm in diameter, spaced between 5-100 μm apart, preferably between 10 and 50 μm apart.

It is an objective of the present invention to render at least part of the break liner surfaces, preferably the friction surface, hydrophobic (contact angle for water greater than 90°), preferably super-hydrophobic (contact angle for water greater than 150°) by introducing surface structures therein containing a plurality of micron-sized features, wherein the plurality of micron-sized features furthermore preferably have a substructure comprising of a plurality of nanoscale features, i.e., the surface sites contain both micro and nanostructured features.

It is an objective of the invention to suitably create metallic surfaces having a low roll-off angle (tilt angle for water less than 25°), preferably a self-cleaning surface having (tilt angle for water less than 5°) by an economic, convenient and reproducible process.

DEFINITIONS

As used herein, the term "friction surface" is referred to as the total surface of e.g., the brake rotor(s) contacted by and mating with the brake pad(s) at any time during braking. For conventional disk brakes it is ring shaped and for brake pads it usually has the form of one outer surface of the brake pad. The friction surface is the outer portion of the braking system where the vehicle's kinetic energy is converted into heat.

As used herein, "exposed surface" and "outer surface" refer to all accessible surface area of an object accessible to a fluid. The "exposed surface area" refers to the summation of all the areas of an article accessible to a fluid.

As used herein, the terms "fiction liner", "break liner", "friction lining", and "break lining" all refer to three dimensional structures/parts comprising the friction surface on at least part of their outer surfaces. Friction liners can be used on brake rotors and brake pads which contact each other during braking. The friction liner material can extend beyond the "friction surface" itself, i.e., in the case of a brake rotor the entire disk can be formed of the liner material although the friction surface may only be the ring shaped area where the brake rotor and the brake pad(s) mate at any time during braking.

As used herein, the term "coefficient of friction" is referred to as the ratio of the frictional force to the force acting perpendicular to the two surfaces in contact. The coefficient of friction is not always the same for objects that are motionless and objects that are in motion; motionless objects often experience more friction than moving ones, requiring more force to put them in motion than to sustain them in motion. The static coefficient of friction (adhesive friction) is the coefficient of friction that applies to objects that are motionless. The kinetic, dynamic or sliding coefficient of friction (abrasive friction) is the coefficient of friction that applies to objects that are in motion. The coefficient of friction depends on a large number of surface conditions, including but not limited to, the temperature and the specific condition of the surface (dry, wet, lubricated, non-lubricated, presence of surface oxides, surface texture).

As used herein, the term "thermal conductivity", measured in Watts per degree Kelvin (W/K), is a measure of the ability of a material to transfer heat. Given two surfaces on either side of the material with a temperature difference between them, the thermal conductivity is the heat energy transferred per unit time and per unit surface area, divided by the temperature difference.

As used herein, the term "coating" means a deposit layer applied to part or all of an exposed surface of a substrate.

As used herein, the term "coating thickness" or "layer thickness" refers to the depth in a deposit direction.

As used herein, the term "microstructure" refers to a microscopic configuration of a material. An example of a microstructure is one that is quasi-isotropic in which a set of crystals are relatively uniform in shape and size and exhibit a relatively uniform grain boundary orientation. Another example of a microstructure is one that is anisotropic in which a set of crystals exhibit relatively large deviations in terms of shape, size, grain boundary orientation, texture, or a combination thereof.

As used herein, the term "grain size" refers to a size of a set of constituents or components, e.g., the crystallites, included in a material, such as a nanostructured material. When referring to a material as being "fine-grained," it is contemplated that the material can have an average grain size in the submicron range, such as in the nm range. Grains/crystallites are attached to each other and are separated by grain boundaries and grains/crystallites are not equivalent to particles, which are independent "unattached" structures, defined by their particle size.

As used herein "variable property" is defined as a deposit property including, but not limited to, chemical composition, grain size, hardness, yield strength, Young's modulus, resilience, elastic limit, ductility, internal stress, residual stress, stiffness, coefficient of thermal expansion, coefficient of friction, thermal conductivity, specific heat capacity, and thickness, being varied by more than 10% in the deposition direction and/or at least in one of the length or width directions. "Layered structures" have said deposit property varied by more than 10% between sublayers and the sublayer thickness ranges from 1.5 nm to 1,000 microns, preferably between 2.5 nm and 250 microns and more preferably between 5 nm and 25 microns. "Graded structures", have at least one property varied by at least 10% and as much as infinity in the deposit direction between deposit grades (levels) and optionally also within a deposit grade (level), i.e., along the length or width of a deposit grade.

As used herein, the term "substrate" refers to a material providing at least one surface for the attachment/deposition of another material, the "deposit". Substrates can be permanent, where the deposit remains attached, or temporary, where the deposit is removed, e.g. after the formation.

As used herein, the term "contact angle" or "static contact angle" is referred to as the angle between a static drop of deionized water and a flat and horizontal surface ($R_a \leq 25$ microns) upon which the droplet is placed. As is well known in the art the contact angle is used as a measure of the wetting behavior of a surface. If a liquid spreads completely on the surface and forms a film, the contact angle is zero degrees (0°). As the contact angle increases, the wetting resistance increases, up to a theoretical maximum of 180°, where the liquid forms spherical drops on the surface. The term "wetproof" is used to describe surfaces having a high wetting resistance to a particular reference liquid; As the wetting behavior depends in part upon the surface tension of the reference liquid, a given surface may have a different wetting resistance (and hence form a different contact angle) for different liquids.

As used herein the "inherent contact angle" or "intrinsic contact angle" is characterized by the contact angle for a liquid measured on a flat and smooth surface not containing any surface structures. Unless otherwise indicted, the liquid is deionized water.

As used herein the term "smooth surface" is characterized by a surface roughness Ra≤0.25 microns.

As used herein the term "hydrophilic" is characterized by the contact angle for deionized water as the reference liquid at room temperature of less than 90°, which means that the water droplet wets the surface.

As used herein the term "hydrophobic" is characterized by the contact angle for deionized water at room temperature of greater than 90°, which means that the water droplet does not wet the surface.

As used herein, "super-hydrophobicity" refers to a contact angle for deionized water at room temperature equal to or greater than 150° and "self-cleaning" refers to a tilt angle of equal to or less than 5°.

As used herein, the term "surface structures" or "surface sites" refers to surface features including recesses, pits, crevices, dents, depressions, elevations, protrusions and the like purposely created in the metallic material to decrease its wettability and increase the contact angle.

As used herein, "surface roughness", "surface texture" and "surface topography" mean a regular and/or an irregular surface topography containing surface structures. Surface roughness consists of surface irregularities which result from the various surface preconditioning methods used such as mechanical abrasion and etching to create suitable surface structures. These surface irregularities/surface structures combine to form the "surface texture" presumably retaining air and are believed to be responsible for the increase in contact angle when compared to a flat surface, particularly, when these features also contain sub-texturing or secondary texturing on the nanoscale, i.e., below 100 nm.

DETAILED DESCRIPTION

Coefficient of Friction

It is well known in the art that braking systems require the coefficient of friction between the mating surfaces to be as high as possible, e. g., in the case of vehicular disk brake systems the friction surface is the total contact surface area between the brake rotor lining and the brake pad. The stopping potential of the brake system is defined as the applied force required to slow the rotation speed of, e.g., the wheel, the brake system is attached to. The braking force is minimized by maximizing the kinetic coefficient of friction between the brake pad and brake liner mating surface(s).

The coefficient of friction (COF) $\mu$ ranges from 0 (ideal lubricity, no friction at all) to 1.0 (solid, no movement). The coefficient of friction of disk brake systems for use in motor vehicles in recent years, increased from about 0.20 into the range of 0.30 to 0.40, and for high performance brake systems to between 0.40 and 0.70.

It is known that the coefficient of friction is not constant and varies with changes in temperature, humidity, wear, age, surface roughness and many other factors. Commercial brake systems therefore seek to provide consistent brake performance over a wide range of operating conditions.

The friction performance of, e.g., brake pads intended for most motor vehicles is classified under SAE Standard J866, expressed as a two-letter code where the first letter designates the low-temperature (0 F/−18° C. to 200 F/93° C.) friction performance and the second letter the high-temperature (200 F/93° C. to 600 F/315° C.) performance (Table 1). If the first letter is lower than the second one, the pad works better at high temperatures and needs a warm-up; if the first letter is higher than the second one, the pad performs poorer at higher temperatures. Ideally brake pads have good friction at both high and low temperatures and both letters are the same, e.g., in GG.

TABLE 1

Brake Pad Friction Designations

| Friction Coefficient [$\mu$] | Code |
| --- | --- |
| ≤0.15 | C |
| >0.15 to 0.25 | D |
| >0.25 to 0.35 | E |
| >0.35 to 0.45 | F |
| >0.45 to 0.55 | G |
| >0.55 | H |
| Unclassified | Z |

The coefficient of friction of coarse-grained steel on steel is reported to be 0.78, when clean and dry, versus 0.27 for the oxide films and 0.39 for sulfide films. In the case of coarse-grained Cu on Cu the coefficient of friction is 1.21, when clean and dry, 0.76 for the oxide films and 0.74 for sulfide films.

It is well known that grain-refined metallic materials are suitable for applications requiring a low coefficient of friction, such as encountered in hydraulic applications where the sliding wear between the mating surfaces needs to be minimized. Similarly, amorphous materials have a lower coefficient of friction than their coarse grained counterparts, e.g., for Zr based metallic glasses coefficients of friction even below 0.1 have been reported.

Facchini et. al. in "Nanostructured Metals and Alloys—Use of Nanostructured Cobalt Phosphorus as a Hard Chrome-Alternative for Functional Applications", Jahrbuch Oberflächentechnik 2008, Band 64, Eugen G. Leuze Verlag, Bad Saulgau, p 34-45, report that the coefficient of friction of metals and alloys decreases with decreasing grain size, specifically for Ni from 0.9 for Ni with a grain size of 10 µm to 0.7 for Ni with a grain size of 100 nm and to 0.5 for Ni with a grain size of 10 nm.

Wang et. al. in "Effect of Surface Nanocrystallization on Friction and Wear Properties in Low Carbon Steel"; Materials Science and Engineering, Volume 352, Issues 1-2, pp 144-149 (2003), used a surface mechanical attrition treatment on a low carbon steel plate to form a ~10 µm thick nanocrystalline surface layer with an average grain size of ~15 nm. The coefficient of friction of the steel plate dropped from 0.2 to 0.1 at an applied load between 2 and 8 N after forming the nanocrystalline surface layer.

According to one aspect of the present invention, the brake system is applied to the wheel of a car, truck, motorcycle or bicycle, where the brake system contains a disk brake permanently attached to the wheel and is positioned to rotate between a single brake pad or one or more pairs of brake pads. The friction surface is created between the brake rotor optionally containing friction liners and brake pads typically containing friction liners and is the surface where, during braking, the kinetic energy is converted to heat. Friction liners of pads are typically chosen to preferentially wear over the friction liner, if any, placed on the brake rotor or the brake rotor itself, as they are easier to service and exchange. The composition and physical properties of the friction surface of rotors and pads are carefully chosen to achieve the desired brake performance and longevity.

Notwithstanding the lower coefficient of friction of amorphous and grain-refined materials when compared to their coarse-grained counterparts, a friction liner according to the present invention can be a suitable fine-grained or amorphous metallic material layer or coating attached to or formed on the surface(s) of the brake part substrate(s), e.g., the rotor, to provide the friction surface(s) in contact with the friction pad(s). Optionally, the friction surface can be at least partly subjected to a suitable finishing treatment which can include, among others, electroplating, i.e., chromium plating. The fine-grained or amorphous metallic material layer forming at least part of the friction surface can be designed to become the part which is not supposed to readily wear and/or the part which is designed to preferentially wear and be periodically replaced.

In the case of vehicles used outdoors a film of water or ice can build up between the brake disk and the pad(s) adversely affecting the braking performance which is an issue in typical road vehicle use as the time between braking applications is usually long enough for the friction surfaces to remain or cool down to below 100° C. Wet surfaces can be avoided by providing surface structures into at least part of the outer surfaces of metallic brake parts to render them hydrophobic. As highlighted above, this approach can also be used to render desired surfaces superhydrophobic and self-cleaning.

Roughening the friction surface increases the coefficient of friction but increases wear but can be suitable for specific applications particularly if the surface is also rendered non-wetting.

Thermal Properties

Heat management of friction liners is addressed by choosing an appropriate design, e.g., providing air flow and cooling during rotation and while driving and the appropriate material choice.

Many high-performance rotors and disks of disk brakes have drilled openings or slots for heat dissipation as they are being relied on to dissipate the heat generated during braking. The heat conductivity of the rotors and rotor liners, if any, needs to be as high as possible to remove the heat from the friction surface and maintain an acceptable operating temperature. Even the friction surface of disk brakes of bicycles can reach temperatures of between 250 and 500° C. on standard brake tests such as DIN EN 14766.

It is also well established in the art that grain-refined and amorphous materials experience a reduction in thermal conductivity compared to their coarse-grained counterparts. Bhattacharya et. al. in "Grain Structure Effects on the Lattice Thermal Conductivity of Ti-based Half-Heusler Alloys"; Applied Physics Letters, Vol 81, Issue 1, pp. 43-45 (2002), investigated Ti-based alloys with the general formula TiNiSn$_{1-x}$Sb$_x$. His FIG. 3 shows a reduction in thermal conductivity of TiNi$_{1-x}$Sn$_x$ for x~0.05 from 10.5 W/mK for an average grain size of 10 µm to 3.7 W/mK for an average grain size of 0.1 µm, i.e., a 65% reduction.

Rowe et. al. in "The Effect of Phonon-Grain Boundary Scattering on the Lattice Thermal Conductivity and Thermoelectric Conversion Efficiency of Heavily Doped Fine-grained, Hot-pressed Silicon Germanium Alloy," Journal of Applied Physics, Vol 52, Issue 12, pp 7421-7426 (1981), investigated a fine-grained, high-density doped n-type Si63.5Ge36.5 alloy over the temperature range between 28° C. and 877° C. for grain sizes in the range 25 µm and <<5 µm. At room temperature the lattice thermal conductivity of the coarse-grained' material was determined to be 4.31 Wm$^{-1}$K$^{-1}$, dropping to 3.10 Wm$^{-1}$K$^{-1}$ for a grain size <<5 µm, a reduction of ~28%.

Similarly Soyez et. al. in "Grain-size-dependent Thermal Conductivity of Nanocrystalline Yttria Stabilized Zirconia Films Grown by Metal-organic Chemical Vapor Deposition"; Applied Physics Letters, Vol 77, Issue 8, pp. 1155-1157 (2000), investigated the grain-size-dependent reduction in the room-temperature thermal conductivity of nanocrystalline yttria-stabilized zirconia. The oxide films were grown by metal-organic chemical vapor deposition with grain sizes in the range of 10 to 100 nm. For grain sizes smaller than approximately 30 nm, a substantial reduction in thermal conductivity was observed, reaching a value of less than one-third the bulk value at the smallest grain sizes measured.

It is also well known in the art that grain-refined and amorphous materials experience grain growth and that their mechanical properties degrade and amorphous materials experience a microstructure conversion and thereafter grain growth also compromising their mechanical properties. Yin et. al. in "Creep Behavior of Nanocrystalline Nickel at 290 and 273K", Materials Science and Engineering A301, pp. 18-22 (2001), reported a 25% decrease in yield strength of nanocrystalline Ni from room temperature (17° C.) to 100° C. The ultimate tensile strength of nanocrystalline Ni at room temperature (17° C.) was determined to be 1.5 GPa whereas it dropped to 1.1 GPa when tested at 100° C. (FIG. 1b in Yin). A similar performances drop is expected in the hardness as yield strength values are proportional to hardness values for materials not exhibiting pronounced strain hardening.

The material choice and the liner design are also very important factors in achieving efficient and quick heat removal. Brake liners therefore ideally contain materials having a high thermal conductivity and specific heat capacity and if anisotropic, align the materials with high thermal conductivity to conduct heat away from the friction surface, i.e., by aligning materials of high thermal conductivity perpendicular to the friction surface.

According to one preferred embodiment the friction liners comprise grain-refined and/or amorphous Ni and Cu layers which are aligned in parallel with the friction surface or not unaligned such as perpendicular to it for improved heat removal.

Thermal stress, cracking and warping is avoided by choosing materials which have a low and similar linear coefficient of thermal expansion (LCTE) and by matching the LCTE of individual components within the brake system.

Wetting Behavior

At least part of an exposed surface portion of the friction liner including the friction surface can be imprinted with surface sites to raise the inherent contact angle for deionized water in the imprinted surface portion at room temperature by at least 10°, preferably by at least at 25°, and more preferably by at least at 50°, when compared to a smooth exposed surface of the metallic material of the same composition as the imprinted surface portion.

Surface sites can be regularly spaced of defined shape and uniform size or they can be irregularly shaped. The metallic materials can be suitably processed to create surface features raising the contact angle for water and rendering the inherently hydrophilic metallic material surface hydrophobic.

Brake Liners for Applications in Motor Vehicles and Bicycles

The brake liners of brake pads contact brake liners of the metal brake disk (rotor) defining the friction surface when the brake is engaged and defines the location where the vehicle's kinetic energy is converted into heat.

Brake liners must be capable of withstanding high temperatures without excessive degradation leading to frequent replacement. Brake pads are designed for providing high friction with their mating surfaces, are designed to wear evenly and preferentially and are replaced regularly. Motor vehicles commonly have two brake pads per caliper, although up to six brake pads with varying frictional properties in a staggered pattern can be used, e.g., on race cars.

Brake pad linings are composed of a relatively soft but tough and heat-resistant material with a high coefficient of dynamic friction (and ideally an identical coefficient of static friction) and are typically mounted on a metal backing. The complete assembly (including lining and backing) is then often called a brake pad or brake shoe. Early brake pads (and linings) contained asbestos, while brake pads presently used are made of ceramics, metals, and polymer materials such as aromatic polyamides.

Brake liners on brake pads and rotors can also be attached to backing plate, e.g., made of Al or Cu alloys or steel.

At present most brake disks/rotors are made of steel, e.g., stainless steel because of its superior corrosion performance. Lightweight brake disks can be made of titanium, magnesium or aluminum and their alloys. The material and disk/rotor design depend on the application and take the vehicle's weight and top speed into consideration. Bicycle rotors therefore are significantly thinner than disks used on, e.g., motorcycles, and bicycle brake rotors often are between 1 and 5 mm thick. The appropriate material choice(s) and brake part design for the brake parts therefore depends on a number of variables. In one preferred embodiment the inventive friction liner is applied to metallic or polymer disk/rotor substrates, in another preferred embodiment the inventive friction liner is applied to metal coated graphite or polymer open cell foam rotor substrates and in yet another preferred embodiment the liner forms the entire brake disk.

According to this invention monolithic brake liners or anisotropic liners such as layered/graded liners can conveniently be prepared using electrodeposition, i.e., grain-refined metal, alloy or metal-matrix composite sheets of the specified thickness can be prepared and then cut to the desired shape. Similarly open cell foams such as graphite foams, or metal coated polymer foams having a porosity in the range of between 20 and 100 pores per inch, can be infiltrated with suitable metallic brake liner materials. As will be appreciated by the person skilled in the art other production process can be used as well to form the grain-refined or amorphous brake liners.

In one embodiment a bicycle rotor that is light weight, wear resistant and has superior heat management can comprise a fine-grained or amorphous brake liner on an Al or Al-alloy rotor. The Al based rotor can be a disk with openings cut to reduce weight and improve air-cooling or, as highlighted above, it can also be an open foam disk such as a graphite or Al-based foam reinforced with an optional coating of grain-refined Cu, Ni, Co, Fe based coating or any other suitable configuration.

Suitable polymer composites for use in bicycle brake rotors include carbon/graphite fiber and glass fiber resin composites in which the resin components include phenolic resins, epoxy resins, polyester resins, urea resins, melamine resins, polyimide resins, polyamide resins as well as elastomers such as natural rubber, polybutadienes, polyisoprenes, butadiene-styrene copolymers, polyurethanes, and thermoplastics such as polyethylene, polypropylene, and the like.

Notwithstanding that grain refined and amorphous metals and alloys have lower coefficients of friction and samlelr heat conductivities when compared to their coarse-grained counterparts and furthermore their mechanical properties can be reduced when exposed to operating temperatures significantly exceeding room temperature, applicants have surprisingly found that amorphous and fine-grained metals and alloys can be used successfully in brake liners when engineered in accordance with the disclosure herein.

Brake Liner Metallic Layer Specification

Metallic materials comprising at least one element selected from the group consisting of Ag, Al, Mg, Au, Co, Cr, Cu, Fe, Ni, Mo, Pb, Pd, Pt, Rh, Ru, Sn, Ti, W, Zn and Zr. Other alloying additions optionally comprising at least one element selected from the group consisting of B, C, H, O, P and S.

Particulate additions optionally comprising at least one material selected from the group consisting of: metals and metal oxides selected from the group consisting of Ag, Al, In, Mg, Si, Sn, Pt, Ti, V, W, Zn; carbides and nitrides, including, but not limited to, Al, B, Cr, Bi, Si, W; carbon (carbon nanotubes, diamond, graphite, graphite fibers); glass; and polymer materials (PTFE, PVC, PE, PP, ABS, epoxy resins). Particulate additions are preferably in the form of powders, fibers, nanotubes, flakes, and the like.

Additional Friction liner specifications are listed in Table 2.

TABLE 2

Friction Liner Specification

| Microstructure: | Amorphous or crystalline |
|---|---|
| Minimum average grain size [nm]: | 2; 5; 10 |
| Maximum average grain size [nm]: | 100; 500; 1,000; 5,000; |
| Metallic layer Thickness Minimum [μm]: | 1; 10; 25; 30; 50; 100 |
| Metallic layer Thickness Maximum [mm]: | 1; 5; 25 |
| Minimum thickness of the sublayer [nm]: | 1.5; 2.5; 5; 50 |
| Maximum thickness of the sublayer [μm]: | 1, 25, 50, 250, 1,000; 5,000; 25,000 |
| Minimum particulate particle size [μm]; | 0.01; 0.1 |
| Maximum particulate particle size [μm]: | 5, 10 |
| Minimum particulate fraction [% by volume]: | 0; 1; 5; 10 |
| Maximum particulate fraction [% by volume]: | 50; 75; 95 |
| Minimum Yield Strength Range [MPa]: | 100; 300 |
| Maximum Yield Strength Range [MPa]: | 2,750 |
| Minimum Hardness [VHN]: | 50; 100; 200; 400 |
| Maximum Hardness [VHN]: | 800; 1,000; 2,000 |
| Minimum contact angle on smooth surface for deionized water at room temperature [°]: | 0, 25, 50, <90, <95, <100 |
| Maximum contact angle on smooth surface for deionized water at room temperature [°]: | 160, 180 |
| Minimum coefficient of friction COF (dry/wet): | 0.25; 0.5, |
| Maximum coefficient of friction COF (dry/wet): | 0.75; 0.8; 0.9 |
| Minimum thermal conductivity [W/mK] | 70; 80; 90; 100; 125; 150, |
| Maximum thermal conductivity [W/mK] | 500; 750; 1,000; 2,000; 3,000; 4,000; 5,000 |
| Minimum specific heat capacity [J/(ml · K)] | 1.75; 2, |
| Maximum specific heat capacity [J/(ml · K)] | 4; 5 |
| Minimum density [g/ml] | 1; 2; 3 |
| Maximum density [g/ml] | 7; 8; 9; 10 |
| Minimum contact angle on smooth surface for deionized water at room temperature [°]: | 0, 25, 50 |
| Maximum contact angle on smooth surface for deionized water at room temperature [°]: | 87, 90 |
| Minimum contact angle on textured surface for deionized water at room temperature [°]: | ≥90, ≥100, ≥105; ≥110; ≥120; ≥130, ≥140 |
| Maximum contact angle on textured surface for deionized water at room temperature [°]: | 150, 180 |
| Minimum linear coefficient of thermal expansion [$10^{-6}$ K$^{-1}$] | 0; 1; 5; 10 |
| Maximum linear coefficient of thermal expansion [$10^{-6}$ K$^{-1}$] | 30; 50; 100 |

In the case of the use of metallic materials, selecting the appropriate chemical composition of friction liners and friction surfaces needs to consider how easily the metallic materials are oxidized, as metal oxide films lower the coefficient of friction by 30-50% compared to the reduced metallic surface. The use of pure Ni and Co based friction surfaces therefore heretofore may not be desired as these metals readily form oxide films in contact with air, which is one of the reasons they are used in sliding wear applications where a lower coefficient of friction is desired.

Furthermore, the metallic friction surface, specifically in the case of high Al, Mg, Ti, Ni, Co, Fe or Cu bearing alloys readily oxidizes/tarnishes in air even at room temperature, which is undesirable as the oxide film lowers the coefficient of friction compared to the reduced metal surface. Notwithstanding the ready oxide formation, according to another aspect of the present invention, Al, Mg, Ti, Ni, Co, Cu and Fe based coatings optionally containing particles are used to provide at least one of the friction surfaces in a brake system.

Brake Liner Substrate Specifications

A number of substrates can be considered as a backing for the inventive brake liners. The linear coefficient of thermal expansion and thermal conductivity of the substrates preferably should be in the same range as the brake liner as indicated in Table 1.

(i) Metallic Substrates

In one preferred embodiment, a brake rotor comprises a substrate made of a metal, including, but not limited to, steel, Cu, Al, Mg and Ti and their alloys. For bicycle brake rotors Al and Al alloys are particularly suited substrates as they are lightweight and have good thermal conductivity. For instance, using electrodeposition, fine grained and or amorphous metallic friction liners can be deposited on one or both sides of Al sheets and brake rotors or pads can be cut from the coated sheets, as desired.

(ii) Graphite Substrates

In another preferred embodiment, a brake rotor comprises a substrate made of a carbon based material, such as carbon/graphite fiber or carbon/graphite foam. The carbon based material can form the substrate of the brake liners, e.g., an open cell graphite foam rotor can be coated with grain-refined metallic materials to provide for improved heat conductivity and strength. Alternatively, graphite fiber/polymer prepreg rotors, brake drums or brake pads can be coated with the brake liner material. The graphite substrate can contain particulate additions such as carbides to further enhance thermal and mechanical properties. In one preferred embodiment the metal coated carbon foam can be infiltrated with the brake liner material for providing superior heat conductivity perpendicular to the friction surface. In yet another embodiment the coated carbon based open cell foam can form the brake liner substrate providing improved heat dissipation/cooling when rotated on the wheel in contact with air and also be partially infiltrated with the brake lining to be part of the substrate and the brake lining.

(iii) Polymer Substrates:

In another preferred embodiment, e.g., when the brake forces are limited such as in bicycles the substrate can include a resin of thermoplastic or thermoset polymer materials that incorporate the metallic friction surface. Suitable polymeric material substrates include crystalline, semi-crystalline and/or amorphous resins as well as unfilled or filled resins. Suitable polymeric substrates include epoxy, phenolic and melamine resins, polyester resins, urea resins; thermoplastic polymers such as thermoplastic polyolefins (TPOs) including polyethylene (PE) and polypropylene (PP); polyamides, including aliphatic and aromatic polyamides, mineral filled polyimide resin composites; polyphthalamides; polyphtalates, polystyrene, polysulfone, polyimides; neoprenes; polybutadienes; polyisoprenes; butadiene-styrene copolymers; poly-ether-ether-ketone (PEEK); polycarbonates; polyesters; liquid crystal polymers such as partially crystalline aromatic polyesters based on p-hydroxybenzoic acid and related monomers; polycarbonates; acrylonitrile-butadiene-styrene (ABS); chlorinated polymers such polyvinyl chloride (PVC); and fluorinated polymers such as polytetrafluoroethylene (PTFE). Useful thermoplastic resins include poly (oxymethylene) and its copolymers; polyesters such as poly (ethylene terephthalate), poly(1,4-butylene terephthalate), poly(1,4-cyclohexyldimethylene terephthalate), and poly(1, 3-propyleneterephthalate); polyamides such as nylon-6,6, nylon-6, nylon-12, nylon-11, nylon-10,10, and aromatic-aliphatic copolyamides; polyolefins such as polyethylene (i.e. all forms such as low density, linear low density, high density, etc.), polypropylene, polystyrene, polystyrene/poly(phenylene oxide) blends, polycarbonates such as poly(bisphenol-A carbonate); fluoropolymers including perfluoropolymers and partially fluorinated polymers such as copolymers of tetrafluoroethylene and hexafluoropropylene, poly(vinyl fluoride), and the copolymers of ethylene and vinylidene fluoride or vinyl fluoride; poly-sulfides such as poly(p-phenylenesulfide); polyetherketones such as poly(ether-ketones), poly(ether-ether-ketones), and poly(ether-ketone-ketones); poly(etherimides); acrylonitrile-1,3-butadiene-styrene copolymers; thermoplastic (meth)acrylic polymers such as poly(methyl methacrylate); and chlorinated polymers such as poly(vinyl chloride), polyimides, polyamideimides, vinyl chloride copolymer, and poly(vinylidene chloride). Useful "thermotropic liquid crystalline polymer" (LCP) include polyesters, poly(ester-amides), and poly(ester-imides). One preferred form of polymer is "all aromatic", that is all of the groups in the polymer main chain are aromatic (except for the linking groups such as ester groups), but side groups which are not aromatic may be present. The thermoplastics may be formed into parts by the usual methods, such as injection molding, thermoforming, compression molding, extrusion, and the like.

These polymeric articles frequently contain fillers including carbon, carbon nanotubes, graphite, graphite fibers, carbon fibers, metals, metal alloys, glass and glass fibers; fiberglass, metallized fibers such as metal coated glass fibers; pigments, dyes, stabilizers, toughening agents, nucleating agents, antioxidants, flame retardants, process aids, and adhesion promoters and the like. Appropriate filler additions in the substrate range from as low as 2.5% per volume or weight to as high as 95% per volume or weight. In addition to fibrous reinforcing fillers with a high aspect ratio, other fillers such as glass, ceramics and mineral fillers such as talc, calcium silicate, silica, calcium carbonate, alumina, titanium dioxide, ferrite, and mixed silicates (e.g. bentonite or pumice) can be employed as well.

(iv) Substrate-Free Friction Liners:

In another preferred embodiment brake liner do not require a substrate, e.g., fine-grained or amorphous metallic materials, including monolithic, graded and layered friction liners can be produced of sufficient thickness that no substrate is required. For instance, using electrodeposition, metal sheets can be formed and brake rotors or pads can be cut from the metallic material sheets, as desired.

The Applicants have surprisingly discovered that fine-grained and/or amorphous metallic materials, although counter-indicated for having a lower coefficient of friction and reduced thermal properties than their coarse grained counterparts, and, at times, for experiencing a degradation of mechanical properties when exposed to temperatures exceeding 100° C. or 200° C. for prolonged periods of time, as well as for being readily oxidized in air, can be employed in commercially viable friction liners.

The foregoing description of the invention has been presented describing certain operable and preferred embodiments. It is not intended that the invention should be so limited since variations and modifications thereof will be obvious to those skilled in the art, all of which are within the spirit and scope of the invention.

The invention claimed is:

1. A stationary or rotating friction liner for a brake system having an exposed surface, at least part of said exposed surface defining a friction surface contacting at least one other friction liner surface when a braking force is applied, said stationary or rotating friction liner comprising a metallic material having a microstructure which is fine-grained with an average grain size between 2 and 5,000 nm and/or an amorphous microstructure, a minimum thermal conductivity of 70 W/mK, a minimum heat capacity of 1.75 J/(ml·K), a minimum hardness of 200 VHN and a linear coefficient of thermal expansion in the range of between 0 and 50 $10^{-6}$ $K^{-1}$,
wherein said friction liner is a component or part of a braking system for a transportation system selected from the group consisting of cars, trucks, motorcycles, all terrain vehicles (ATV), snowmobiles and bicycles,
wherein said braking system is selected from the group consisting of a brake rotor, a brake disk, a brake pad and a brake drum, and
wherein said metallic material is configured to achieve a deceleration rate from a maximum speed between 25 km/hr and 100 km/hr of at least 5 m/sec$^2$.

2. The friction liner according to claim 1, wherein said metallic material is selected from the group of:
(i) one or more metals selected from the group consisting of Ag, Al, Mg, Au, Co, Cr, Cu, Fe, Ni, Mo, Pd, Pt, Rh, Ru, Sn, Ti, W, Zn and Zr,
(ii) pure metals or alloys containing at least two of the metals listed in (i), further containing at least one element selected from the group of B, C, H, O, P and S;
(iii) any of (i), (ii) or (iii) where said metallic coating also contains particulate additions in the volume fraction between 0 and 95% by volume.

3. The friction liner according to claim 2, wherein said metallic material contains particulate addition and said particulate addition is of one or more materials which is a metal selected from the group consisting of Ag, Al, Cu, In, Mg, Si, Sn, Pt, Ti, V, W, Zn; a metal oxide selected from the group consisting of $Ag_2O$, $Al_2O_3$, $SO_2$, $SnO_2$, $TiO_2$, ZnO; a carbide of B, Cr, Bi, Si, W; carbon selected from the group consisting of carbon nanotubes, diamond, graphite, graphite fibers; ceramic, glass; and polymer material selected from the group consisting of PTFE, PVC, PE, PP, ABS, epoxy resin.

4. The friction liner according to claim 1, wherein said metallic material has an average grain size between 2 and 500 nm.

5. The friction liner according to claim 1 which is anisotropic.

6. The friction liner according to claim 5, wherein said metallic material comprises a multilayer laminate having a sublayer thickness in the range of 1.5 nm to 1,000 microns.

7. The friction liner according to claim 6, wherein said multilayers are not aligned parallel to the friction surface.

8. The friction liner according to claim 7, wherein said multilayers are aligned perpendicular to the friction surface.

9. The friction liner according to claim 5, wherein said metallic material is graded or comprises at least one graded layer.

10. The friction liner according to claim 6, wherein said metallic material consists of alternating layers comprising Ni and Cu.

11. The friction liner according to claim 6, wherein said metallic material consists of alternating layers comprising Co and Cu.

12. The friction liner according to claim 1, wherein said metallic material comprises at least one element selected from the group of Ni, Co and Fe and at least one element selected from the group consisting of Cu, Sn and Zn.

13. The friction liner according to claim 6, wherein said metallic material comprises at least one element selected from the group of Ni, Co and Fe and at least one element selected from the group consisting of Cu, Sn and Zn.

14. The friction liner according to claim 1 attached to a polymeric substrate.

15. The polymeric substrate material according to claim 14 selected from the group consisting of unfilled or filled epoxy, phenolic resins, melamine resins, polyester resins, urea resins; thermoplastic polymers including thermoplastic polyolefins (TPOs) including polyethylene (PE) and polypropylene (PP); polyamides, mineral filled polyamide resin composites; polyphthalamides, polyphtalates, polystyrene, polysulfone, polyimides; neoprenes; polybutadienes; polyisoprenes; butadiene-styrene copolymers; poly-ether-ether-ketone (PEEK); polycarbonates; polyesters; liquid crystal polymers such as partially crystalline aromatic polyesters based on p-hydroxybenzoic acid and related monomers; polycarbonates; acrylonitrile-butadiene-styrene (ABS); chlorinated polymers such polyvinyl chloride (PVC); and fluorinated polymers including polytetrafluoroethylene (PTFE).

16. The polymeric substrate material according to claim 14 containing at least one filler selected from the group consisting of metals, metal oxides; carbonates, silicates, mica, bentonite, pumice, carbides of B, Cr, Bi, Si, and W; carbon, carbon fibers, carbon nanotubes, diamond, graphite, graphite fibers; glass; glass fibers; fiberglass and metallized fibers.

17. The friction liner according to claim 1 attached to a metallic substrate.

18. The metallic substrate material according to claim 17 selected from the group consisting of steel, Cu, Al, Mg and Ti and alloys thereof.

19. A friction liner according to claim 1 comprising surface with at least a portion thereof having a surface microstructure to raise the contact angle for deionized water at room temperature in said surface portion to at least 90°.

20. A friction liner according to claim 1 mounted on a bicycle wheel wherein said friction liner is attached to a substrate selected from the group consisting of an Al-based substrate, a Cu based substrate, a Mg based substrate, a Ti-based substrate and a carbon fiber composite based substrate.

21. A friction liner according to claim 20 mounted on a bicycle brake rotor.

* * * * *

UNITED STATES PATENT AND TRADEMARK OFFICE
CERTIFICATE OF CORRECTION

PATENT NO. : 9,004,240 B2  
APPLICATION NO. : 13/778166  
DATED : April 14, 2015  
INVENTOR(S) : Gino Palumbo et al.

Page 1 of 1

It is certified that error appears in the above-identified patent and that said Letters Patent is hereby corrected as shown below:

In the Claims

Col. 17, Line 47 in Claim 3, please replace "SO2" with --SiO2--.

Signed and Sealed this  
Twenty-fifth Day of August, 2015

Michelle K. Lee  
*Director of the United States Patent and Trademark Office*